United States Patent
Vaswani et al.

(10) Patent No.: US 12,007,777 B2
(45) Date of Patent: Jun. 11, 2024

(54) ADAPTIVE LEARNING SYSTEM FOR LOCALIZING AND MAPPING USER AND OBJECT USING AN ARTIFICIALLY INTELLIGENT MACHINE

(71) Applicant: RN CHIDAKASHI TECHNOLOGIES PVT. LTD., Mumbai (IN)

(72) Inventors: Sneh Vaswani, Mumbai (IN); Prashant Iyengar, Mumbai (IN); Chintan Raikar, Mumbai (IN); Ravi Vaidyanathan, London (GB)

(73) Assignee: RN CHIDAKASHI TECHNOLOGIES PVT. LTD., Mumbai (IN)

( * ) Notice: Subject to any disclaimer, the term of this patent is extended or adjusted under 35 U.S.C. 154(b) by 0 days.

(21) Appl. No.: 17/421,359

(22) PCT Filed: Feb. 21, 2021

(86) PCT No.: PCT/IN2021/050165
§ 371 (c)(1),
(2) Date: Jul. 7, 2021

(87) PCT Pub. No.: WO2021/165996
PCT Pub. Date: Aug. 26, 2021

(65) Prior Publication Data
US 2023/0147768 A1    May 11, 2023

(30) Foreign Application Priority Data
Feb. 21, 2020  (IN) .............................. 202021007553

(51) Int. Cl.
*G05D 1/00*    (2006.01)
*G06F 11/34*   (2006.01)
*G06N 3/008*   (2023.01)

(52) U.S. Cl.
CPC ......... *G05D 1/0221* (2013.01); *G05D 1/0088* (2013.01); *G05D 1/0246* (2013.01); *G05D 1/0255* (2013.01); *G05D 1/0274* (2013.01)

(58) Field of Classification Search
CPC .. G05D 1/0255; G05D 1/0251; G05D 1/0221; G06N 3/045; G06N 3/0409;
(Continued)

(56) References Cited

U.S. PATENT DOCUMENTS 5,488,559 A * 1/1996 Seymour ................. G01S 19/47
                                          342/357.31
9,600,767 B1 * 3/2017 Nogin ....................... G06N 5/04
(Continued)

FOREIGN PATENT DOCUMENTS

| CN | 108664119 A | * | 10/2018 | ............. G06F 3/011 |
| EP | 2110777 A1 | * | 10/2009 | ............. G06N 3/008 |
| EP | 3454259 A1 | * | 3/2019 | ............. G06F 11/34 |

*Primary Examiner* — Yuri Kan (57) ABSTRACT

A system for behaviour mapping and categorization of objects and users in an 3D environment for creating and learning user behaviour map is provided. The system includes a robot 102, a network 104 and a central AI system 106. The robot 102 is embedded with an array of acoustic sensors 108 and visual sensors 110 for behaviour mapping and categorization the objects and users in the 3D environment and generates an auditory behaviour map and a visual behaviour map based on sensory inputs from the acoustic sensors 108 and visual sensors 110. The robot 102 transmits the acoustic source sensory input and the visual source sensory input to the central AI system 106 over the network 104 for generating a global behaviour map. The central AI system 106 tunes the global behaviour map to a specific user by tuning the detection and classification model to data obtained from a specific 3D environment that corresponds to the specific user.

12 Claims, 7 Drawing Sheets

(58) Field of Classification Search
CPC . G06N 3/08; G06N 5/04; G06N 3/008; G01S 19/47; G06F 11/34; G06F 3/011
See application file for complete search history.

(56) References Cited

U.S. PATENT DOCUMENTS

| | | | |
|---|---|---|---|
| 2009/0254217 A1* | 10/2009 | Pack | G06N 3/008 700/246 |
| 2019/0197402 A1* | 6/2019 | Kovács | G06N 3/045 |
| 2021/0034959 A1* | 2/2021 | Wood | G06N 3/0409 |
| 2022/0101136 A1* | 3/2022 | Wood | G06N 3/08 |

* cited by examiner

ADAPTIVE LEARNING SYSTEM FOR LOCALIZING AND MAPPING USER AND OBJECT USING AN ARTIFICIALLY INTELLIGENT MACHINE

BACKGROUND

Technical Field

Embodiments of this disclosure generally relate to localization and mapping of users and objects, and more particularly, to a system and method of learning based framework for behaviour mapping and categorization of users and objects and learning their respective behaviours using an artificially intelligent machine.

Description of the Related Art

Nowadays, artificially intelligent (AI) robots have been used for personalized interaction with users by locating the user in an environment personally and initiating conversation with the user. The artificially intelligent robots act like a human companion. Still, several researches have been ongoing to develop a robot that should behave like a human. In a conventional system, the robots are fed with a map along with user location on the environment. The orientation map is one time generated and is not scalable for any changes in the environment and the user location. The robot may locate the user in the environment using the map along with the user location. Upon locating the user, the robot may initiate a conversation with the user through any kind of modality like speaking, texting, playing songs or videos etc. However, the user location and user behavior may be dynamic. The conventional system may not adaptable and scalable to dynamic user behavior and his location.

It is very important to know the user behavior with respect to time for personalized interaction. For example, if the robot plays a song while the user is studying, it may cause a nuisance to the user. Existing approaches do not focus on creating user behavior maps rather focusing on only localizing and mapping of the user using multiple sensors and generates a user location map. Hence, it would not possible to provide personalized interaction with the user by the robots using the existing approaches.

Since from a long time, there have been several mapping techniques are available to detect the user in the environment using sensing techniques and generate the user location map. However, the user location map alone would not sufficient to engage with the user personally by the robot. None of the existing approaches do focus on learning user behavior for locating the user in the environment and providing a personalized experience.

Accordingly, there remains a need for an adaptive learning system and method for responses that are customised to the behaviour of the user, using a robot.

SUMMARY

In view of the foregoing, an embodiment herein provides a system for behaviour mapping and categorization of one or more sources of one or more sensory inputs by learning their respective behaviour using an artificially intelligent machine. The system includes the artificial intelligence (AI) machine, one or more sensors and a processor that includes of a memory and a behaviour mapping and categorization module. The processor is configured to (a) detect the one or more sensory inputs associated with a three dimensional (3D) environment using the one or more sensors; (b) determine the one or more sources of the one or more sensory inputs by processing the one or more sensory inputs and behaviour mapping and categorization of the one or more sources and an associated timeline the 3D environment; (c) generate a sensory behaviour map of the 3D environment with the one or more sources, wherein the sensory behaviour map comprises a location and mapping of the one or more sources in the 3D environment and a sensory interaction associated with each of the one or more sources and an associated timeline of the sensory behaviour; (d) identify and categorize the one or more sources by a classifier into one or more category levels, detect one or more behaviours associated to the one or more sources in the 3D environment, wherein the one or more behaviours are categorized into a behaviour category by analysing the one or more sensory inputs and the location of the one or more sources in the 3D environment and an associated timeline of the one or more behaviours, wherein the sensory interaction is between two or more sources or between one or more sources and objects in the 3D environment; (e) determine an intelligent response, based on an adaptive learning input, that is customized to at least one of (i) the one or more sources, (ii) the one or more behaviours of the one or more sources, (iii) the timeline of the one or more behaviours or (vi) a combination thereof, or based on an input from the one or more sources, wherein the intelligent response is determined by recognizing the one or more behaviours associated to each of the one or more sources, the location of the one or more sources or a timeline of the one or more behaviours; and (0 enable the AI machine to move to the location using the sensory behaviour map to execute the intelligent response.

In an embodiment, the processor is configured to determine the intelligent response by (i) analysing the sensory behaviour map and the timeline of the one or more behaviours, (ii) identifying a pattern of each of the one or more behaviours associated with the one or more sources over a recurring time period and, (iii) associating the location to the one or more behaviours or associating the location and the timeline to each of the one or more behaviours.

In another embodiment, the processor is configured to generate the sensory behaviour map by detecting auditory sensory inputs and one or more sources associated with auditory sensory inputs to enable learning of a visual representation of the one or more sources associated with the auditory sensory inputs, wherein the sensory behaviour map comprises the visual representation of the one or more sources associated with the auditory sensory inputs or combination of the visual sensory inputs and the auditory sensory inputs.

In yet another embodiment, the processor is configured to generate the sensory behaviour map by detecting visual sensory inputs and one or more sources associated with the visual sensory inputs to enable learning of an auditory representation of the one or more sources associated with the visual sensory inputs, wherein the sensory behaviour map comprises the auditory representation of the one or more sources associated with the visual sensory inputs or combination of the visual sensory inputs and the auditory sensory inputs.

In yet another embodiment, the processor is configured to generate the sensory behaviour map by generating a first sensory map based on auditory sensory inputs and one or more sources associated with the auditory sensory inputs, generating a second sensory map based on visual sensory inputs and one or more sources associated with the visual sensory inputs, and analysing the first sensory map and the second sensory map and associating the one or more sources associated with the auditory sensory inputs and the one or more sources associated with the visual sensory inputs along with the location and the timeline in the 3D environment using the associated location coordinates to generate the sensory behaviour map.

In yet another embodiment, the processor is configured to associate the behaviour of the one or more sources associated with the one or more sensory interactions and feed the behaviour mapping and categorization module for the adaptive learning by commanding the AI machine to move to the location at a suitable timeline using the sensory behaviour map to determine the behaviour associated with the sensory interactions using the one or more sensors.

Optionally, the processor is configured to generate an orientation map of the one or more sources by determining a position, and a spatial orientation of the one or more sources in the 3D environment, wherein the spatial orientation is determined with respect to at least one of (i) the AI machine (ii) at least one object in the 3D environment, and (iii) a detected boundary of the 3D environment.

Optionally, the classifier is a source categorization multi-stage ensemble algorithm that is configured to detect and classify the one or more sensory inputs of the one or more sources and generate an associated confidence score at a first level and classify a category label and the associated confidence score at the first level of multi-stage ensemble algorithm and output a second category and an associated second confidence score at a second level.

Optionally, when the sensory input is a visual sensory input, the classifier uses a visual processing technique to categorise the one or more sources into one or more category levels, wherein the one or more sensors are visual sensors.

Optionally, when the sensory input is an auditory sensory input, the classifier uses a source categorization multi-stage ensemble algorithm to categorise the one or more sources into one or more category levels, wherein the one or more sensors are acoustic sensors.

In an embodiment, the processor is configured to generate the sensory behaviour map, wherein when the sensory input comprises an auditory sensory input and a visual sensory input, the classifier uses a source categorization multi-stage ensemble algorithm to categorise the one or more sources associated with the auditory sensory input into one or more category levels and an visual processing technique to categorise the one or more sources associated with the visual sensory input into one or more category levels, wherein the one or more sensors comprise visual sensors and acoustic sensors.

Optionally, the one or more sources comprise a sound source that is tracked using one or more tracking algorithms, wherein the one or more tracking algorithms tracks a motion profile of the AI machine, a location of the sound source and a current position of the AI machine along with a previous location of the sound source and a previous position of the AI machine.

Optionally, the classifier comprises two or more ensemble classifiers, wherein the classifier identifies which of the ensemble classifier out of the two or more ensemble classifiers provide the best performance for identifying and categorizing the one or more sources and selects the best performing ensemble classifier for subsequent events of the sensory interactions by enabling the system to learn which algorithm is suitable for detecting and categorizing each of the one or more sources.

In an embodiment, the behaviour mapping and categorization module is trained using a multiple two-dimensional (2D) and a three-dimensional (3D) visual and auditory samples associated with the one or more sources in the 3D environment to recognize a position of one or more first sources or one or more second sources in the 3D environment by creating a spatial orientation map comprising of the one or more first sources associated with a sound or a movement in the 3D environment, wherein the spatial orientation map enables localizing or identifying the behaviour to generate the intelligent response customized to the one or more sources.

In one aspect, there is provided a method for behaviour mapping and categorization one or more sources of one or more sensory inputs by learning their respective behaviour using an artificially intelligent machine. The method includes steps of (a) detecting the one or more sensory inputs associated with a three dimensional (3D) 3D environment using the one or more sensors; (b) determining the one or more sources of the one or more sensory inputs by processing the one or more sensory inputs and behaviour mapping and categorization of the one or more sources and an associated timeline the 3D environment; (c) generating a sensory behaviour map of the 3D environment with the one or more sources, wherein the sensory behaviour map comprises a location and mapping of the one or more sources in the 3D environment and a sensory interaction associated with each of the one or more sources and an associated timeline of the sensory behaviour; (d) identifying and categorizing the one or more sources by a classifier into one or more category levels; (e) detecting one or more behaviours associated to the one or more sources in the 3D environment, wherein the one or more behaviours are categorized into a behaviour category by analysing the one or more sensory inputs and the location of the one or more sources in the 3D environment and an associated timeline of the one or more behaviours, wherein the sensory interaction is between two or more sources or between one or more sources and objects in the 3D environment; (f) determining an intelligent response, based on an adaptive learning input, that is customized to at least one of (i) the one or more sources, (ii) the one or more behaviours of the one or more sources, (iii) the timeline of the one or more behaviours or (vi) a combination thereof, or based on an input from the one or more sources, wherein the intelligent response is determined by recognizing the one or more behaviours associated to each of the one or more sources, the location of the one or more sources or a timeline of the one or more behaviours; and (g) enabling the AI machine to move to the location using the sensory behaviour map to execute the intelligent response.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system for behaviour mapping and categorization of users and objects in an 3D environment for learning and creating a user behaviour map. The embodiments herein achieve this by proposing an adaptive learning system and method for learning and creating user behaviour map using an artificially intelligent system. Referring now to the drawings, and more particularly to FIGS. 1 through 7, where similar reference characters denote corresponding features consistently throughout the figures, there are shown preferred embodiments.

Figure 1:
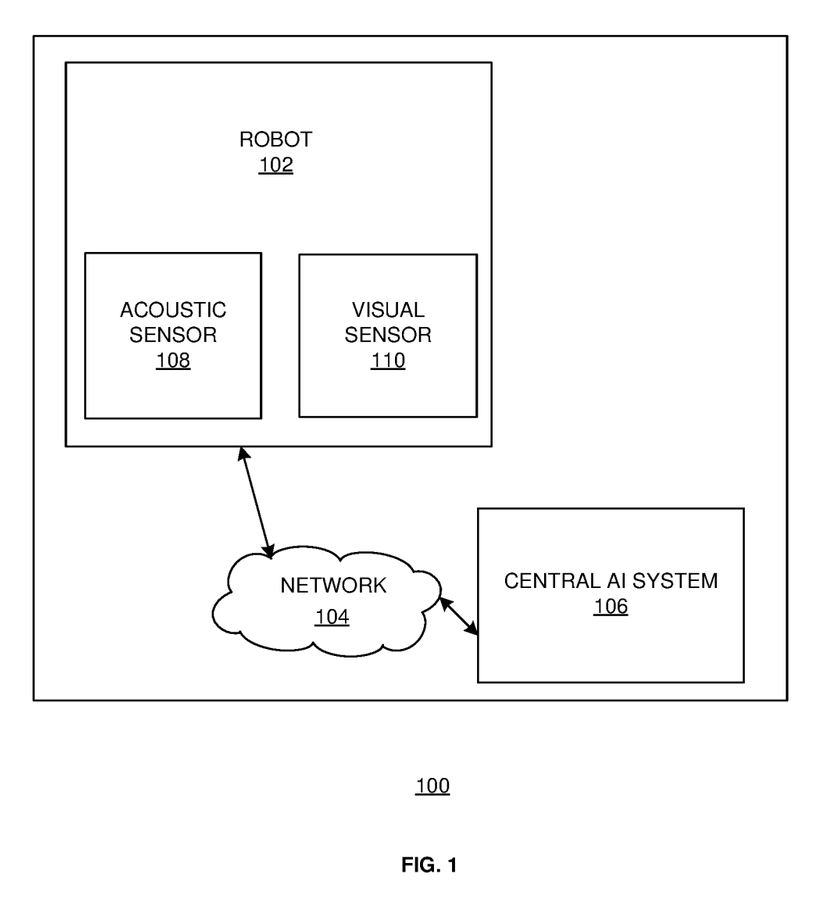
FIG. 1 illustrates a schematic diagram of an adaptive learning system for behaviour mapping and categorization of users and objects and learning their behaviours in an 3D environment to create a user behaviour map in accordance with the embodiments herein.

FIG. 1 illustrates a schematic diagram of an adaptive learning system 100 for behaviour mapping and categorization of one or more sources of one or more sensory inputs. The one or more sources may include users and objects and learning their behaviours in a three-dimensional (3D) environment to create a sensory behaviour map in accordance with the embodiments herein. The adaptive learning system includes an artificially intelligent (AI) machine or a robot 102, a network 104 and a central artificial intelligence (AI) system 106. The robot 102 is equipped with an array of acoustic sensors 108 and visual sensors 110 for behaviour mapping and categorization of one or more sources and learning their behaviours in the 3D environment to create the sensory behaviour map of each of the user or the object in the 3D environment. The sensory behaviour map may include a visual behaviour map or an auditory behaviour map or a combination of both for the one or more sources located in the 3D environment. The adaptive learning system may be configured to generate the sensory behaviour map by detecting auditory sensory inputs and one or more sources associated with the auditory sensory inputs and to generate the sensory behaviour map by detecting visual sensory inputs and one or more sources associated with the visual sensory inputs, wherein sensory inputs are received from the acoustic sensors 108 or the visual sensors 110. Optionally, the sensory behaviour map is generated by generating a first sensory map based on auditory sensory inputs and one or more sources associated with the auditory sensory inputs, generating a second sensory map based on visual sensory inputs and one or more sources associated with the visual sensory inputs and analysing the first sensory map and the second sensory map and associating the one or more sources associated with the auditory sensory inputs and the one or more sources associated with the visual sensory inputs along with the location in the 3D environment using the associated location coordinates to generate the sensory behaviour map.

Optionally, the sensory behaviour map is generated, when the sensory input comprises an auditory sensory input and a visual sensory input, a classifier uses a source categorization multi-stage ensemble algorithm to categorise the one or more sources associated with the auditory sensory input into one or more category levels and an visual processing technique to categorise the one or more sources associated with the visual sensory input into one or more category levels, wherein the one or more sensors comprise visual sensors and acoustic sensors. Optionally, the classifier comprises two or more ensemble classifiers, wherein the classifier identifies which of the ensemble classifier out of the two or more ensemble classifiers provide the best performance for identifying and categorizing one or more sources and selects the best performing ensemble classifier for subsequent events of the sensory interactions by enabling the system to learn which algorithm is suitable for a detection and the categorizing of each of the one or more sources.

In some embodiments, the acoustic sensors 108 include but not limited to pressure microphones, prepolarized condenser microphone and high amplitude pressure microphones. In an embodiment, the visual sensors 110 include but not limited to a camera. The robot 102 localizes and maps one or more sources that include at least one of the objects or users position relative to an AI machine or the robot 102 or using at least one of an array of acoustic sensors 108 or an array of visual sensors 110. In some embodiments, the 3D environment is an indoor 3D environment. In an embodiment, the object is determined to be, not limited to a furniture, a TV, a flower vase, a laptop, toys, a computer, and sound systems. In an embodiment, the array of acoustic sensors 108 employs beam forming techniques to detect an auditory source position relative to the robot 102. The robot 102 generates an auditory behaviour map using acoustic sensory input data received from the array of acoustic sensors 108. In an embodiment, the array of visual sensors 110 employs imaging techniques to detect a visual source position relative to the robot 102. The robot 102 generates a visual behaviour map using visual sensory input data received from the array of visual sensors 110. The robot 102 is configured with a local Artificial Intelligence (AI) model that is trained with information from at least one of the array of acoustic sensors 108 or the array of visual sensors 110 for behaviour mapping and categorization of the users and the objects and learning their behaviours in the 3D environment. In an embodiment, the local Artificial Intelligence (AI) model with the adaptive learning system is trained with the auditory behaviour map and the visual behaviour map for behaviour mapping and categorization of the users and the objects in the 3D environment. The central AI system 106 receives an acoustic source sensory input and a visual source sensory input from the robot 102 over the network 104 to train a generic Artificial Intelligence (AI) model with data of one or more users and one or more objects in the 3D environment. In an embodiment, the central AI system 106 receives the auditory behaviour map and the visual behaviour map from the robot 102 and generates a sensory behaviour map. In an embodiment, the network 104 includes but not limited to a wired network, a wireless network, a combination of wired and wireless network, internet, Ethernet, and VPN. In some embodiments, the central AI system 106 receives the auditory behaviour map and the visual behaviour map from one or more robots 102 in one or more environments. In an embodiment, the sensory behaviour map comprises behaviour of particular locality or region or area or street and one or more sources located in that locality or region or area or street. The adaptive learning system may be configured to associate the behaviour of the one or more sources associated with the one or more sensory interactions and feed the behaviour mapping and categorization module for the adaptive learning by commanding the AI machine or the robot 102 to move to the location at a suitable timeline using the sensory behaviour map to determine the behaviour associated with the sensory interactions using one or more sensors. The one or more sources may be identified by the sensory inputs and categorised based on the sensory inputs, for example auditory or visual sensory inputs, by the classifier into one or more category levels. Example of the category level is animate or inanimate, human, pet, work related, recreation, human interaction, human behaviour, indoor objects, outdoor objects, a vehicle, a kitchen appliance etc. The central AI system 106 may detect one or more behaviours associated to the one or more sources in the 3D environment, wherein the one or more behaviours are categorized into a behaviour category by analysing the one or more sensory inputs and the location of the one or more sources in the 3D environment and an associated timeline of the one or more behaviours. The sensory interaction may be between two or more sources or between one or more sources and objects in the 3D environment. For example, the location of an identified user is in kitchen, and behaviour is recognised as coffee making, the robot 102 may assist at the determined time to assist the identified user in the kitchen at particular time or a day. The central AI system 106 may determine an intelligent response. The intelligent response is determined based on an adaptive learning input, that is customized to at least one of (i) the one or more sources, (ii) the one or more behaviours of the one or more sources, (iii) the timeline of the one or more behaviours or (vi) a combination thereof, or based on an input from the one or more sources. For example, the user commanding robot 102 to turn on air conditioner in the bedroom at 10 pm. The intelligent response is determined by recognizing the one or more behaviours associated to each of the one or more sources, the location of the one or more sources or a timeline of the one or more behaviours. For example, if a user is interacting with a computer, the user is identified, the object, computer is identified, by processing visual sensory input from visual sensors. The behaviour of the user may be categorised as work. The timeline and the location of the user at the time of the behaviour is recorded and based on adaptive learning input, an intelligent response is determined, which is then delivered by the robot 102 at the location, for example, home office room, at determined appropriate time. For example, turning on air conditioner by the robot 102 at the time the identified user will be at the home office and will work.

In an exemplary embodiment, the auditory behaviour map and the visual behaviour map provides information on 1) where objects are located at which environment?, 2) at what time what behaviours are performed?, 3) whether the users are talking, speaking, sleeping, sitting, listening to music, watching TV, 4) what objects are present in users home? and the like.

The central AI system 106 tunes the generic Artificial Intelligence (AI) model to adapt to each of the one or more sources, for example a specific user. The central AL system 106 determines the behaviour of the each of the one or more sources, determines the location of each of the one or more sources. The specific user is identified based on analysis of the sensory inputs received and by categorizing using a classifier. An intelligent response is determined customised to the specific user based on the behaviour of the user, the location as determined using location coordinates with respect to the other objects or sources or persons in the 3D environment. In an embodiment, intelligent response is determined customised to the specific user using the location, timeline or combination of both. The AI machine or the robot 102 is enabled to move to the location that is determined of the user with the intelligent response that is customised to the user, based on the behaviour associated with the specific user, the location associated and the timeline of sensory input received by the user. In an embodiment, the generic Artificial Intelligence (AI) model is adapted to the specific user by tuning the detection and classification models or techniques with the data obtained from a specific environment. In an embodiment, the intelligent response is adapted by the adaptive learning input to suit the behaviour, the timeline and the user behaviour in recurring time. For example, time in a day, month or a year. The intelligent response may be determined by (i) analysing the sensory behaviour map and the timeline of the one or more behaviours, (ii) identifying a pattern of each of the one or more behaviours associated with the one or more sources over a recurring time period and, (iii) associating the location to the one or more behaviours or associating the location and the timeline to each of the one or more behaviours. The robot 102 may, for example, determine that a user B wakes up at 8 am, takes a coffee in the kitchen and works from 9 am to 5 pm on weekdays in home office and sleeps at 11 pm in bedroom. The robot can determine an intelligent response of waking the person up on weekdays at 8 am, serve a coffee at 9 am, turn relaxing music on after 5 pm, control the ambient lights in the evening etc. The robot 102 is capable of continuously learning and adapting the behaviour of the user B. The intelligent response may be selected from a list of predetermined actions and their priority of execution.

In an embodiment, the central intelligence system 106 is configured on a cloud server. In an embodiment, the central AI system 106 is configured on-premises. The central AI system 106 provides the sensory behaviour map to a local system (i.e. robot 102). In some embodiments, the robot 102 uses the sensory behaviour map when the robot 102 is in new environment for learning. For example, if the robot 102 is in the new environment and with new user, the robot 102 uses determined general behaviour from the sensory behaviour map for localizing and behaviour mapping of the new user during initial phase. The robot 102 uses the timeline of behaviours from the sensory behaviour map for localizing and behaviour mapping the new user during initial phase. The robot 102 uses a timeline of behaviours to locate the auditory source and the visual source which increases the pace of learning of the local system. The sensory behaviour map may be generated by detecting auditory sensory inputs and one or more sources associated with auditory sensory inputs to enable learning a visual representation of the one or more sources associated with the auditory sensory inputs, wherein the sensory behaviour map comprises the visual representation of the one or more sources associated with the auditory sensory inputs or combination of the visual sensory inputs and the auditory sensory inputs.

The robot 102 generates the auditory behaviour map by (i) detecting or localizing the auditory sources or sound sources in the environment using the array of acoustic sensors 108, (ii) separating the detected auditory sources or sound sources, (iii) classifying and categorizing the auditory sources or sound sources, (iv) detecting behaviour of the auditory sources or sound sources, (v) tracking the robot 102 and the auditory sources or sound sources in the environment, (vi) generating an auditory behaviour map by mapping detected location of the auditory sources or sound sources with respect to the environment along with time at which auditory sources or sound sources behaviour is detected, and (vii) searching the auditory sources or sound sources to update the auditory behaviour map. To generate the sensory behaviour map, when the sensory input comprises an auditory sensory input and a visual sensory input, the classifier uses a source categorization multi-stage ensemble algorithm to categorise the one or more sources associated with the auditory sensory input into one or more category levels and an visual processing technique to categorise the one or more sources associated with the visual sensory input into one or more category levels, wherein the one or more sensors comprise visual sensors and acoustic sensors. The sensory behaviour map may be determined by detecting visual sensory inputs and one or more sources associated with the visual sensory inputs to enable learning an auditory representation of the one or more sources associated with the visual sensory inputs, wherein the sensory behaviour map comprises the auditory representation of the one or more sources associated with the visual sensory inputs or combination of the visual sensory inputs and the auditory sensory inputs.

In an embodiment, the robot 102 generates an orientation map to determine the position of at least one of the auditory sources or the visual sources in the environment. The robot 102 updates the orientation map by updating the position of the object or person in the environment. The robot 102 updates the location of the auditory sources or the visual sources and time of detection of the auditory sources or the visual sources in the orientation map to upgrade the orientation map.

The robot 102 detects the auditory sources or sound sources in the environment using the array of acoustic sensors 108.

The robot 102 separates the auditory sources or sound sources by separating sound streams that correspond to each auditory source or sound source.

The robot 102 classifies and categorizes the auditory sources or sound sources using multi-stage ensemble algorithms. In an embodiment, the multistage ensemble algorithms include AI algorithms, ONN algorithms, and/or probabilistic models. The first stage of the ensemble algorithm provides sound classification and associated confidence scores as an output for the sound streams of the auditory sources or sound sources. The second stage of the ensemble algorithm receives an input from the first stage of ensemble algorithms that includes a category label and a confidence score and provides a second category and associated confidence score to a soft voting classifier. The multistage ensemble algorithm provides a facility to a local AI system or the central AI system 106 to learn which of ensemble methods work well for data provided and also provides enhanced performance compared to a single-stage ensemble classification followed by the soft voting classifier. In an embodiment, the ensemble algorithms are classifiers. In an embodiment, the ensemble classifiers are classifiers of same type with different models trained using different data sets. In an embodiment, the ensemble classifiers are classifiers of same type which is trained with different data sets and trained with different algorithm parameters (e.g. iteration time). The different ensemble classifiers have different bias and variance trade-offs for different input sources which provide better results. In an embodiment, the ensemble classifier with two-stage classification may provide high confidence for the ensemble classifier that provides the best variance for improved accuracy and generalization characteristics. In an embodiment, the two-stage ensemble classifier may learn which of the ensemble classifier provides the best performance.

The robot 102 categorizes sound behaviour simultaneously with sound classification. In an embodiment, the robot 102 classifies the auditory sources or sound sources as a human sound or an object sound. The robot 102 detects and classifies the human sound behaviour or object sound behaviour. In an embodiment, the human sound behaviour includes but not limited to speaking, shouting, crying and/or whispering. In an embodiment, the object sound behaviour includes but not limited to a television at high volume, a television at low volume, a speaker at high volume, a speaker at low volume, a car approaching and/or a car leaving. In an embodiment, the robot 102 obtains background sound stream and unidentified sound stream by extracting known audio stream of the classified sound sources from the main sound stream.

In an embodiment, one or more acoustic landmarks are positioned or fixed in the environment relative to each other. The one or more acoustic landmarks may include a docking pad or docking station which indicates (0, 0) position and provides location information to the robot 102. The one or more acoustic landmarks may receive as well as emits acoustic sensory inputs. The robot 102 detects the acoustic sensory inputs emitted by the one or more acoustic landmarks and processes the acoustic sensory input to estimate the location of the robot 102 with respect to the one or more acoustic landmarks. The robot 102 detects or locates the auditory sources or sound sources in the environment by identifying the one or more acoustic landmarks in the environment using the array of acoustic sensors. In an embodiment, the robot 102 is embedded with one or more odometric sensors. In an embodiment, the robot 102 moves in the environment and computes its position using the one or more odometric sensors. In an embodiment, the robot 102 uses position estimates from at least one of the array of acoustic sensors 108 or the one or more odometric sensors and executes a sensor fusion algorithm to determine a position of the robot 102 in the environment.

The robot 102 and the auditory sources or sound sources are tracked using a tracking algorithm. In an embodiment, the robot motion profile and the auditory source or sound source motion profile is compared to track the robot 102 and the auditory sources or sound sources. In an exemplary scenario, if the robot 102 and the auditory source or sound source are stationary, a new relative position of the auditory source or sound source, sound category, the robot's 102 current position and previous position are estimated. In another exemplary scenario, if both the robot 102 and the auditory source or sound source are in motion, the robot motion profile and the auditory source or sound source motion profile are compared. If the auditory source or sound source motion profile is smaller than the robot motion profile for a small unit of time, it is determined that the auditory source or sound source is stationary and the robot 102 is in motion. The example cases include but not limited to (i) the robot 102 is turning around while a user talking, and (ii) the robot 102 is moving toward the user while the user is talking. If the auditory source or sound source is stationary and the robot 102 is in motion, the position of the auditory source or sound source is estimated and tracked for a small unit of time. In another exemplary scenario, if both the robot 102 and the auditory source or sound source are in motion, the robot motion profile and the auditory source or sound source motion profile are compared. If the auditory source or sound source motion profile is significantly higher than the motion profile of the robot 102, it is determined that the robot 102 is stationary and the auditory source or sound source is in motion. The example cases include but not limited to (i) a user walking towards the robot 102. and (ii) the user turning around and talking. If the auditory source or sound source is in motion and the robot 102 is stationary, the direction of the auditory source or sound source is computed. In an embodiment, the robot 102 and the auditory source or sound source is performed for each of the auditory source or sound source. The estimated position and confidence or variance in estimation is updated in a position map when the robot 102 moves in the environment.

The robot 102 continuously tracks which of the auditory source or sound source is introduced and which of the auditory source or sound source is ceased. The robot 102 identifies when the auditory source or sound source of a specific type has started (i.e. it is active) and the auditory source or sound source of specific type has stopped. In an exemplary embodiment, the robot 102 identifies when a TV is switched on and off (i.e. when it is introduced and when it is ceased), when clapping is started and stopped, when speaking is started and stopped, and when signing is started and stopped.

The robot 102 tracks a timeline of the auditory source or sound source of specific type behaviour and constructs a pattern of which the auditory source or sound source of specific type are prevalent at what times during a day. The robot 102 constructs a pattern of timeline over behaviours of auditory source or sound source over days, weeks, months and years.

The robot 102 localizes its position in the environment and builds a 2D or 3D orientation map of the location of the auditory sources or sound sources in the 3D environment. The robot 102 creates a timeline at which the auditory source or sound source position and behaviours in the 3D environment. The robot 102 localizes the auditory source or sound source not only with respect to robot 102 and also with respect to the 3D environment. In some embodiments, the robot 102 generates a sensory behaviour map based on space-time probability by correlating a 2D or 3D orientation map of the location of the auditory sources or sound sources and a timeline of auditory sources or sound sources position or behaviour.

The robot 102 searches for the auditory source or sound source in the environment as the robot 102 knows the location of the auditory source or sound source and has a probability estimation of the location of the auditory source or sound source. The robot 102 directly goes to the locations of the auditory source or sound source at a specified time as per the space-time probability map generated by the robot 102. The robot 102 updates the auditory behaviour map with the location, position, behaviour of the auditory source or sound source based on the positive or negative detection. This searching modality of robot 102 for updating the auditory behaviour map with respect to time improves the accuracy of the auditory behaviour map. In an embodiment, the robot 102 updates or removes the old sources in the auditory behaviour map.

The auditory behaviour map determines a user and environment behaviour and evolution of behaviour with respect to time. In an embodiment, the user and environment behaviour include but not limited to (i) What location users in the house are present with respect to time? (ii) When do user like to speak to each other? (iii) When do user watch Television and where is Television located? (iv) When do user like to speak to the robot 102? (v) What behaviours are performed at what time such as signing, speaking and silence?

The robot 102 determines the behaviour of each object or each user in the environment by generating an individual behaviour map for each object or each user.

The robot 102 generates the visual behaviour map by (i) visually localizing the object or user, (ii) segmenting the localized object or user, (iii) classifying the segmented object or user, (iv) recording timeline that the object or user detected, (v) generating an object map by detecting object or user, a position of the robot 102 and a position of the object or user in the environment, (vi) generating an orientation map by capturing feature of the environment, (vii) generating the visual behaviour map by correlating the object map, the timeline and the orientation map, and (viii) searching the object or user in the environment to update the visual behaviour map.

The robot 102 detects the location and position of the object or person in the environment using the array of the visual sensor 110. The robot 102 segments the localized one or more sources including objects or persons. The robot 102 segments the static object in robot views. In an embodiment, the robot 102 uses 2D segmentation, Structure from Motion SFM techniques, 3D segmentation techniques for segmenting the localized object or user. In an embodiment, the robot 102 includes a monochromatic camera. The robot 102 also segments the localized object or user by creating motion profiles of the one or more sources with respect to the robot 102. The objects or user in motion with respect to the robot 102 is segmented based on a group of visual pixels that move as part. In some embodiments, the robot 102 moves towards the image and away from the image to generate the 3D segmentation of the object or user. The robot 102 classifies the segmented object or user into predetermined categories. In an embodiment, the pre-determined categories include but not limited to a user, a Television, a fridge, a sofa, tables, kitchen, room, bed, door, outdoor, and indoor. The robot 102 records one or more sources of sensory inputs that include objects or users that are detected and time at which the objects or users are detected in the 3D environment and determines location associated with the one or more sources with relation to the 3D environment. The robot 102 may generate the spatial orientation map by detecting object or user, a position of the robot 102 and a location of the object or user in the 3D environment. The robot 102 generates the spatial orientation map by capturing features of the environment. In an embodiment, the robot 102 generates the orientation map by (i) detecting the 3D environment, (ii) detecting changes in the 3D environment, and (iii) relating the objects in the 3D environment. The robot 102 maintains object or user location map by using location coordinates, space and time map with respect to the 3D environment. The group of space and time map is associated with the 3D environment. The robot 102 searches objects or users by directly locating the objects or users in the environment. The robot 102 updates the space and time map with the location of the objects or users based on the positive or negative detection. The visual behaviour map detects the location of the objects or user and time of the objects at the location. In the exemplary scenario, the robot 102 detects where objects are located?, what time the object is located?, When one or more sources exit and enter the 3D environment, or the location in the 3D environment by determining position coordinates of the objects or the users. The robot 102 creates visual behaviour map over different time granularities, such as short term and long term by averaging probabilities of object or user location over day, week, month and year. In the case of the person, the robot 102 also recognizes the user in addition to detection. The robot 102 creates the visual behaviour map for each user that the robot 102 encounters. The robot 102 further detects a behaviour of the user or object. In an embodiment, the behaviour includes but not limited to person is sitting, standing, singing, sleeping, eating and/or moving. The robot 102 records the behaviour of the individual user or object at different locations and time and incorporates record behaviour with respect to time in the visual behaviour map.

In an embodiment, the robot 102 combines the auditory behaviour map and the visual behaviour map to perform comprehensive behaviour detection. The auditory source is reinforced by a visual behaviour map for increasing the accuracy of space-time probability map as well as behaviour map. In an example, behaviours such as user clapping, and user speaking are detected using the array of acoustic sensors 108 and visual sensors 110. In another example, user signing is detected using the acoustic sensors 108 with high accuracy than the visual sensors 110. In another example, the user dancing is detected using the visual sensors 110 with high accuracy than the acoustic sensors. The auditory sources and visual sources may possess various behavioural states. Few of the states of the auditory sources and visual sources may disjoint that can only be detected either by the acoustic sensor or visual sensor. Few of the states of the auditory sources and visual sources may intersect that can be detected by both the acoustic sensors 108 and visual sensors 110. In some scenarios, both the acoustic sensors 108 and the visual sensors 110 are required to detect a behaviour of the user or object. If the user is silent or the person left the scene and re-entered the scene cannot be detected by the acoustic sensor 108 only. The visual sensor 110 also used to detect the user is silent or the user left the scene and re-entered the scene along with the acoustic sensor 108. The visual sensor 110 provides the information that whether the user present in the scene or not and the acoustic sensor 108 provides the information that whether the user is speaking or silent.

In one embodiment, the robot 102 captures the visual images of the user when the user is silent and speaking, to train the local artificial intelligence (AI) model for classifying the user states/behaviour such as silent or speaking based on visual processing alone. For example, the television is detected by the visual sensor 110. The robot 102 builds an auditory mode of the sound source of the television for detecting the television using auditory mode alone.

In one embodiment, the robot 102 captures the audio sound of the user or object from a dual acoustic source for training an acoustic local detection and classification system using edge AI algorithms or local AI algorithms in the sensory input from the alternative acoustic source. In an embodiment, the robot 102 captures visual images of the user or object under different lighting conditions and angles to train local visual detection and classification model using the edge AI algorithms.

The central AI system 106 receives an acoustic source sensory input and a visual source sensory input from the robot 102 over the network 104 to train the generic Artificial Intelligence (AI) model with data of one or more users and one or more objects in the environment. In an embodiment, the central AI system 106 receives the auditory behaviour map and the visual behaviour map from the robot 102 and generates a sensory behaviour map. The positive auditory and visual source is sent to the central AI system 106 to train the generic Artificial Intelligence (AI) model for providing better variability. In an embodiment, the information from both audio source and visual source in the environment may help to train the detection and classification of the sensory input from another auditory sources and visual sources. In an embodiment, if dual data (visual and audio data of the object) is obtained then labelled data is sent to the central AI system 106 of object when the central AI system does not have information about the object, or the central AI system 106 accuracy is less. The generic Artificial Intelligence (AI) model evolves based on data dynamically from the environment. The generic Artificial Intelligence (AI) model is adapted to a specific user by tuning the detecting and classification model with the data obtained from the specific environment using transfer learning or increment/online training-based AI algorithms. The user-specific sensory behaviour map is transferred to the robot 102. As more data about known sources, and dual sources are obtained, both the local model and global model learns continuously for improved accuracy. In an embodiment, the sensory behaviour map is provided to the robot 102 even though the local orientation map varies. The robot 102 uses a timeline of behaviours in the sensory behaviour map to locate the auditory source and the visual source for increased learning in the local environment. The intelligent response is delivered by the robot 102, based on an adaptive learning input, that is customized to at least one of (i) the one or more sources, (ii) the one or more behaviours of the one or more sources, (iii) the timeline of the one or more behaviours and (vi) a combination thereof, or based on an input from the one or more sources.

Figure 2:
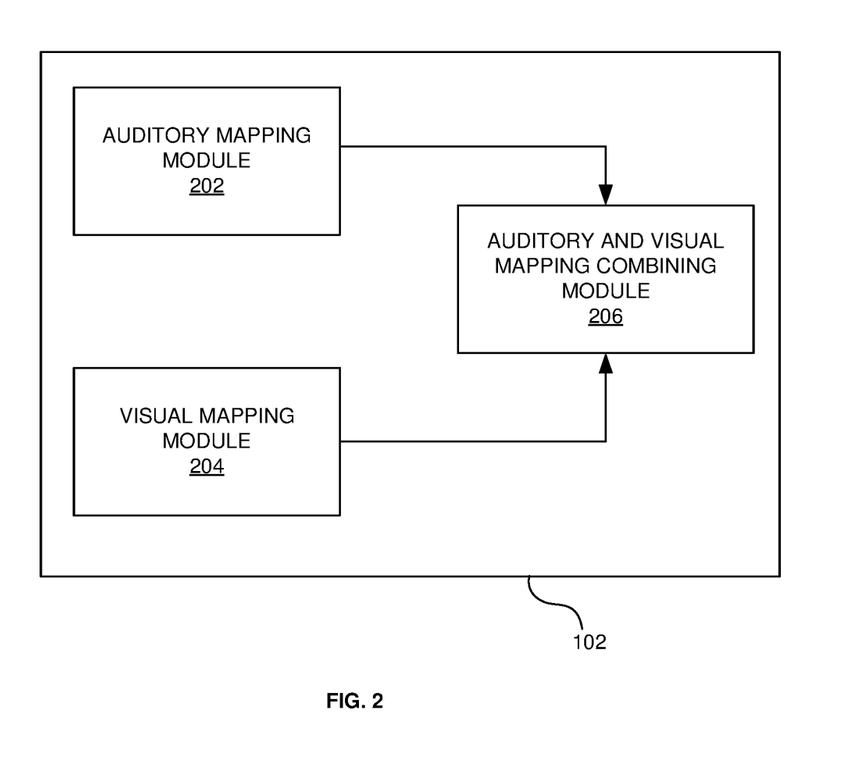
FIG. 2 illustrates an exploded view of a robot device of FIG. 1 for behaviour mapping and categorization of users and objects in an 3D environment in accordance with the embodiments herein.

FIG. 2 illustrates an exploded view of a robot 102 of FIG. 1 for behaviour mapping and categorization of users and objects in an environment in accordance with the embodiments herein. The robot 102 includes an auditory mapping module 202, a visual mapping module 204, and an auditory and visual mapping combining module 206. The auditory mapping module 202 generates an auditory behaviour map to locate the objects or users in the environment. In some embodiments, the robot 102 uses the auditory behaviour map to locate the user in the environment for initiating conversation with the user. The auditory mapping module 202 generates the auditory behaviour map by (i) detecting or localizing the auditory sources or sound sources in the environment using the array of acoustic sensors 108, (ii) separating the detected auditory sources or sound sources, (iii) classifying and categorizing the auditory sources or sound sources, (iv) detecting behaviour of the auditory sources or sound sources (v) tracking the robot 102 and the auditory sources or sound sources in the environment, (vi) generating an auditory behaviour map by mapping detected location of the auditory sources or sound sources with respect to the environment along with time at which auditory sources or sound sources behaviour is detected, and (vii) searching the auditory sources or sound sources to update the auditory behaviour map. The visual mapping module 204 generates the visual behaviour map by (i) visually localizing the object or user, (ii) segmenting the localized object or user (iii) classifying the segmented object or user, (iv) recording timeline that the object or user detected, (v) generating an object map by detecting object or user, a position of the robot 102 and a position of the object or user in the environment, (vi) generating an orientation map by capturing feature of the environment, (viii) generating the visual behaviour map by correlating the object map, the timeline and the orientation map, and (vii) searching the object or user in the environment to update the visual behaviour map. In some embodiments, the visual mapping module 204 detects a position, movement, behaviour, location, time of movement of the object or user in the indoor environment. The auditory and visual mapping combining module 206 improves the accuracy of the generated behaviour map by combining information from both the array of acoustic sensors 108 and visual sensors 110. In some embodiments, the auditory source may be reinforced by the visual behaviour map to increase the accuracy of the space-time probability map and the behaviour map. In some embodiment, the movement of the user not limited to at least one sitting, walking, lying etc. The central artificial intelligence system receives the input from the auditory mapping module 202 and the visual mapping module 204. The central artificial intelligence system generates a sensory behaviour map.

Figure 3:
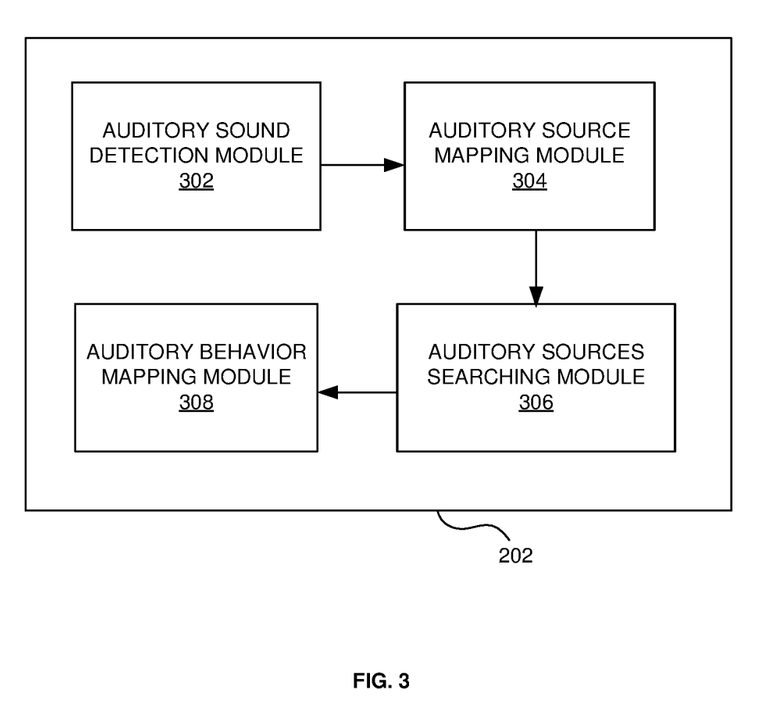
FIG. 3 illustrates an exploded view of an auditory mapping module of FIG. 2 in accordance with the embodiments herein.

FIG. 3 illustrates an exploded view of an auditory mapping module of FIG. 2 in accordance with the embodiments herein. The auditory mapping module 202 detects a location and a behaviour of the object or using the acoustic sensor 108 with respect to time for creating the auditory behaviour map. The auditory mapping module 202 includes an auditory sound detection module 302, an auditory source mapping module 304, an auditory source searching module 306, and an auditory behaviour mapping module 308. The auditory sound detection module 302 (i) receives sound source sensory input from the array of acoustic sensor 108 in the environment to determine a location of the object or users, (ii) separates sound sources in the environment, (iii) classifies and categorizes the sound sources, (iv) extracts background sound stream from the obtained sound stream if the sound stream is known or begins to learn the sound source if the sound stream is unknown, (v) tracks the sound source and the robot 102, and (vi) detects a position of the sound source and position of the robot 102 with respect to the environment. The auditory sound detection module 302 continuously tracks to find which of sound sources have been introduced and which of sound sources have been ceased. The auditory sound detection module 302 maintains a pattern of which auditory sources are prevalent at what times during a day. The auditory source mapping module 304 (i) localizes a position of the auditory source with respect to the environment and with respect to the robot 102, (ii) generates the 2D/3D auditory source location map, (iii) creates timeline at which the auditory source and its position in the environment.

The auditory source searching module 306 searches or locates the auditory sources in the environment using a 2D/3D auditory source location map and a timeline of auditory sources. The auditory source searching module 306 updates the 2D/3D auditory source location map and the timeline of auditory sources based on positive or negative detection of location of the object or user. In some embodiments, the auditory source searching module 306 updates the 2D/3D auditory source location map and the timeline of auditory sources with detected location information and time of the detection of the auditory sources. The auditory behaviour map module 308 determines the behaviour of the environment and the behaviour of the object or user in the indoor environment. The auditory behaviour mapping module 308 determines the evolution of the objects or the user in the environment with time.

Figure 4:
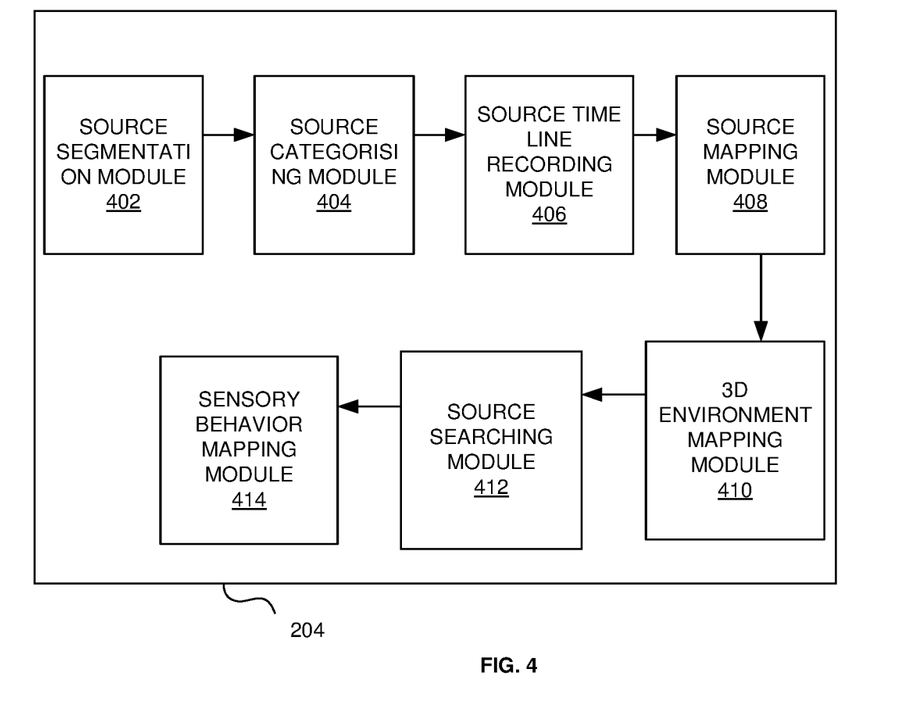
FIG. 4 illustrates an exploded view of a visual mapping module of FIG. 2 in accordance with the embodiments herein.

FIG. 4 illustrates an exploded view of a visual mapping module of FIG. 2 in accordance with the embodiments herein. The visual mapping module 204 determines a position and location of the object or the user in the environment using an array of visual sensor 110. The visual mapping module 204 includes a source segmentation module 402, a source categorizing module 404, a source timeline recording module 406, a source mapping module 408, a 3D orientation mapping module 410, a source searching module 412, and a sensory behaviour mapping module 414. The source segmentation module 402 detects and segments a static object in the AI machine or robot's view. In some embodiments, the source segmentation module 402 segments the object in motion with respect to the robot 102 by grouping pixels of the objects in motion. The source categorizing module 404 classifies the segmented source in the 3D environment into pre-determined categories. The source timeline recording module 406 records the object or user detected in the environment and records the time of the detection of the object or user in the environment.

The source mapping module 408 generates a sensory behaviour map of one or more sources by detecting the object or user in the 3D environment, determining a position of the robot 102 and a location of the object or user in the 3D environment. The 3D orientation mapping module 410 generates an orientation map by capturing features of the 3D environment. In some embodiments, the orientation map is generated by (i) detecting the environment, (ii) detecting changes in the environment, and (iii) relating the one or more sources in the 3D environment. In some embodiments, the object timeline map, the object map and the 3D orientation map are correlated with each other to generate a visual behaviour map. The source searching module 412 searches the object or the user in the 3D environment by locating the robot 102 in the location that exhibits highest probability of the user presence. The source searching module 412 updates the visual behaviour map based on the positive or negative detection of the object in the 3D environment. The sensory behaviour mapping module 414 detects objects or user location and time where the objects or user can be found. In some embodiments, the visual behaviour map is created over different time granularities (i.e. short term and long term) by averaging probabilities of object location over day, week, month and years.

Figure 5:
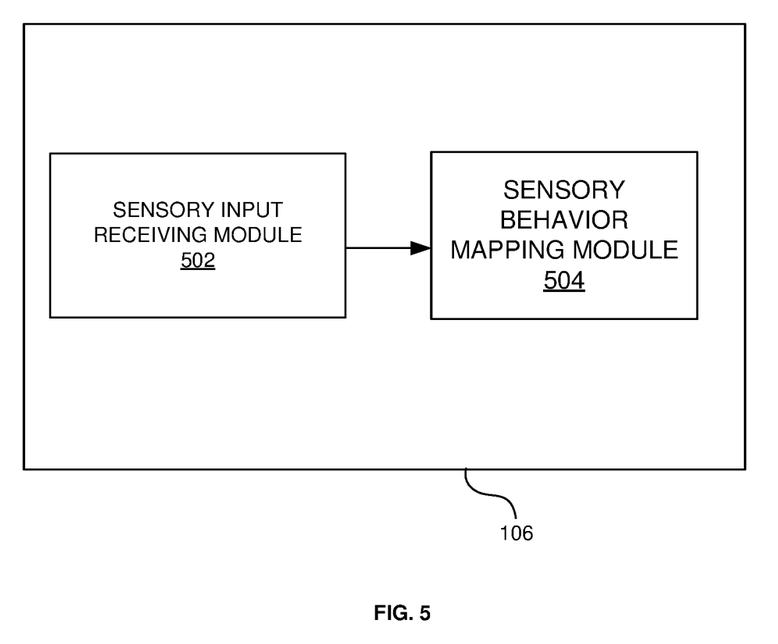
FIG. 5 illustrates an exploded view of a central artificial intelligence system of FIG. 1 in accordance with the embodiment herein.

FIG. 5 illustrates an exploded view of a central artificial intelligence system 106 of FIG. 1 in accordance with the embodiment herein. The central artificial intelligence system 106 includes a sensory input receiving module 502 and a sensory behaviour mapping module 504. The sensory input receiving module 502 receives the sensory input from an array of acoustic sensors 108 and visual sensor embedded in the robot 102. In some embodiments, the sensory input receiving module 502 receives the auditory behaviour map and the visual behaviour map from the robot 102. The sensory behaviour mapping module 504 is configured with an Artificial Intelligence adaptive learning model that receives the auditory behaviour map and the visual behaviour map from the sensory input receiving module 502 and generates a sensory behaviour map. In some embodiments, the auditory and visual behaviour maps are uploaded to the central artificial intelligence system 106. In some embodiments, the uploaded behaviour map includes at least one of the locations of the object or user in the 3D environment, the behaviours performed by the object or user in the 3D environment, the time of behaviours performed by the object or user in the 3D environment. In some embodiments, the sensory behaviour mapping module 504 is provided to a local system in the 3D environment. In some embodiments, the local 3D orientation mapping is different from sensory mapping of the one or more sources.

Figure 6:
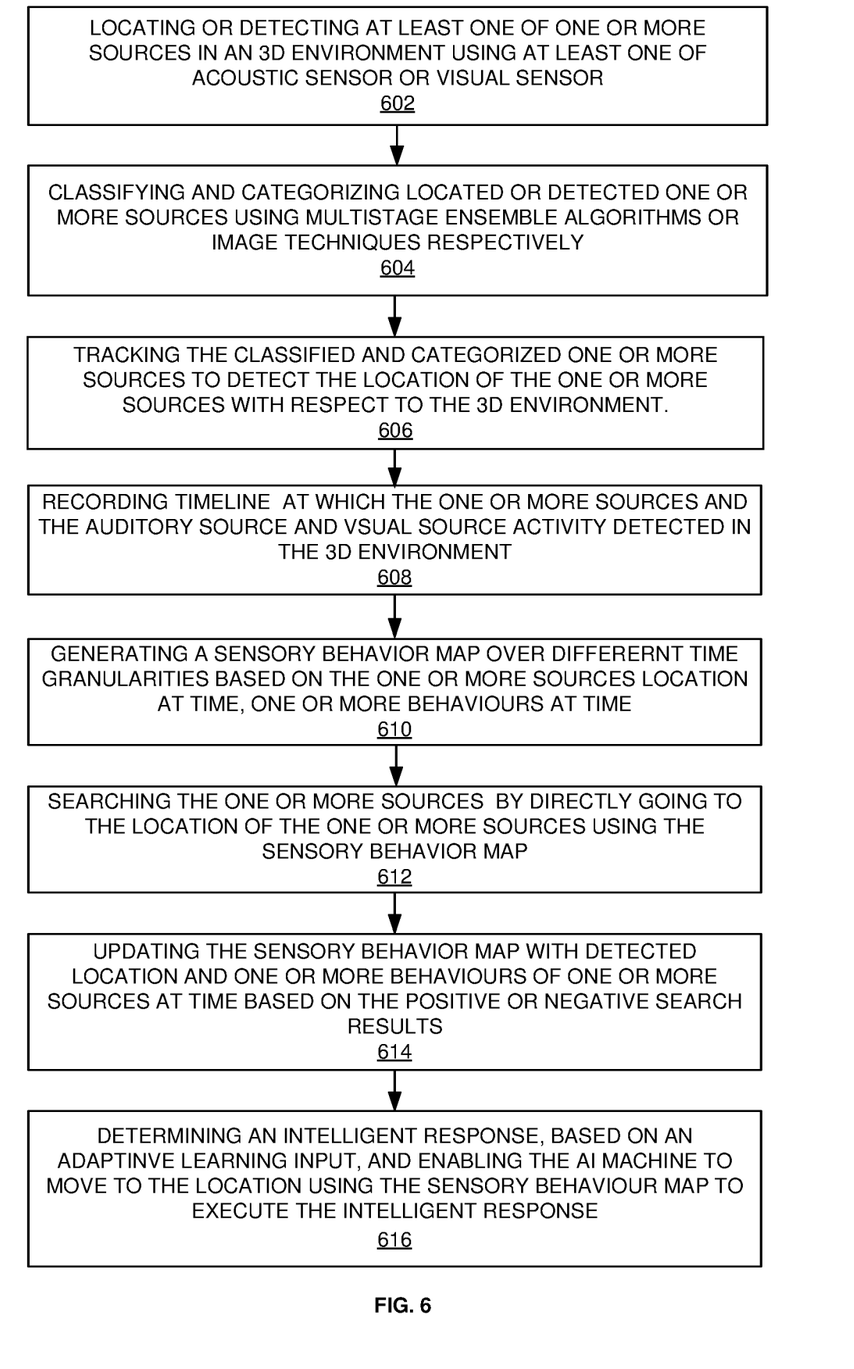
FIG. 6 is a flow chart that illustrates a learning method for behaviour mapping and categorization of users and objects and learning their behaviours in an 3D environment for creating a user behaviour map in accordance with the embodiments herein.

FIG. 6 is a flow chart that illustrates a learning method for behaviour mapping and categorization of users and objects in an 3D environment and learning their behaviours in an 3D environment for creating a user behaviour map in accordance with the embodiments herein. At step 602, one or more sources are localized or detected in an 3D environment using at least one of acoustic sensor 108 or visual sensor 110. The one or more sources may include auditory or visual sources. At step 604, the located or detected one or more sources are classified and the behaviour associated with the one or more sources is categorized using multistage ensemble algorithms or visual processing techniques respectively for visual sensory inputs and auditory sensory inputs. At step 606, the classified and categorized auditory source or visual source is tracked to detect a location of the auditory source or visual source with respect to the 3D environment. At step 608, the timeline is recorded at which the one or more sources and the behaviour associated with is detected in the 3D environment. At step 610, a sensory behaviour map is generated over different time granularities based on the one or more sources location at time, one or more behaviours at time. At step 612, the one or more sources are searched or located by directly going to the location of the one or more sources using the sensory behaviour map. The sensory behaviour map may include visual map, auditory map of the one or more sources or combination thereof. At step 614, the sensory behaviour map is updated with detected location and one or more behaviours of one or more sources at time based on the positive or negative search results. At step 616, an intelligent response is determined based on an adaptive learning input and AI machine or a robot is enabled to move to the location using the sensory behaviour map to execute the intelligent response.

Figure 7:
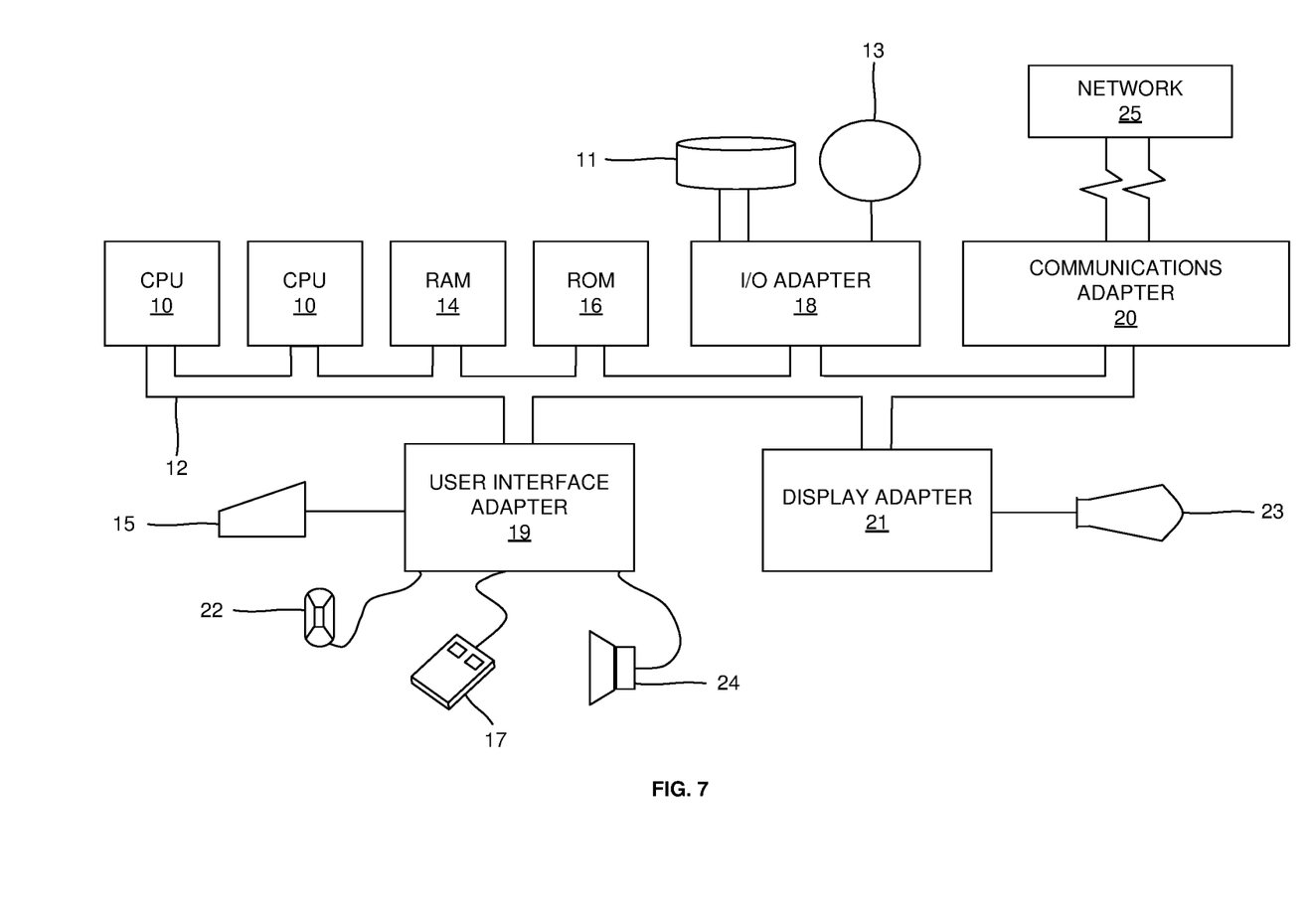
FIG. 7 is a schematic diagram of computer architecture in accordance with the embodiments herein.

A representative hardware 3D environment for practicing the embodiments herein is depicted in FIG. 7, with reference to FIGS. 1 through 6. This schematic drawing illustrates a hardware configuration of a server/computer system/computing device in accordance with the embodiments herein. The system includes at least one processing device CPU 10 that may be interconnected via system bus 14 to various devices such as a random access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the proposition of description and not of limitation. Therefore, while the embodiments herein have been described in terms of preferred embodiments, those skilled in the art will recognize that the embodiments herein can be practiced with modification within the spirit and scope of the appended claims.

We claim:

1. A system for behaviour mapping and categorization of one or more sources of one or more sensory inputs by learning their respective behaviour using a robot, the system comprising:

the robot;

one or more sensors, and;

a processor comprising of a memory, wherein the processor is configured to:

detect the one or more sensory inputs comprising a visual sensory input and an auditory sensory input, associated with a three-dimensional (3D) environment using the one or more sensors comprising visual sensors and acoustic sensors;

determine the one or more sources of the one or more sensory inputs by processing the one or more sensory inputs and behaviour mapping and categorization of the one or more sources and an associated timeline of the 3D environment;

generate a sensory behaviour map of the 3D environment with the one or more sources, wherein the sensory behaviour map comprises a location and mapping of the one or more sources in the 3D environment and a sensory interaction associated with each of the one or more sources and an associated timeline of the sensory behaviour, wherein the processor is configured to: generate the sensory behaviour map by: (i) analyzing the auditory sensory input and the visual sensory input and (ii) associating the one or more sources associated with the auditory sensory input and the one or more sources associated with the visual sensory input along with the location and the timeline in the 3D environment using the associated location coordinates;

identify and categorize the one or more sources by a classifier comprising a source categorization multistage ensemble algorithm, into one or more category levels by (i) classifying, using the classifier, the one or more sensory inputs of the one or more sources to generate an associated confidence score at a first level and classifying a first category label for entities using the source categorization multi-stage ensemble algorithm that detects and classifies the associated confidence score of the one or more sensory inputs at the first level of the source categorization multi-stage ensemble algorithm, (ii) classifying, using the classifier, a second category label for entities and an associated second confidence score at a second level of the source categorization multi-stage ensemble algorithm with inputs from the first level of the source categorization multi-stage ensemble algorithm, and (iii) categorizing the one or more sources into the one or more category levels with the first category label and the second category label, wherein classifiers of same type are trained with different data sets and different algorithm parameters comprising iteration time;

detect one or more behaviours associated to the one or more sources and the one or more category levels in the 3D environment, wherein the one or more behaviours are categorized into a behaviour category by analyzing the one or more sensory inputs and the location of the one or more sources in the 3D environment and an associated timeline of the one or more behaviours, wherein the sensory interaction is between two or more sources or between one or more sources and objects in the 3D environment;

determine an intelligent response, based on an adaptive learning input, that is customized to (i) the one or more sources, (ii) the one or more behaviours of the one or more sources, (iii) the timeline of the one or more behaviours or (vi) a combination thereof, or based on an input from the one or more sources, wherein the intelligent response is determined by (a) analyzing the sensory behaviour map and the timeline of the one or more behaviours, (b) identifying a pattern of each of the one or more behaviours associated to each of the one or more sources over a recurring time period, and (c) associating the location to the one or more behaviours or associating the location and the timeline to each of the one or more behaviours; and enable the robot to move to the location using the sensory behaviour map to execute the intelligent response, wherein the intelligent response comprises a list of predetermined actions and their priority of execution.

2. The system of claim 1, wherein the processor is configured to generate the sensory behaviour map by detecting auditory sensory inputs and one or more sources associated with auditory sensory inputs to enable learning of a visual representation of the one or more sources associated with the auditory sensory inputs, wherein the sensory behaviour map comprises the visual representation of the one or more sources associated with the auditory sensory inputs or combination of the visual sensory inputs and the auditory sensory inputs.

3. The system of claim 1, wherein the processor is configured to generate the sensory behaviour map by detecting visual sensory inputs and one or more sources associated with the visual sensory inputs to enable learning of an auditory representation of the one or more sources associated with the visual sensory inputs, wherein the sensory behaviour map comprises the auditory representation of the one or more sources associated with the visual sensory inputs or combination of the visual sensory inputs and the auditory sensory inputs.

4. The system of claim 1, wherein the processor is configured to associate the behaviour of the one or more sources associated with the one or more sensory interactions and feed the adaptive learning by commanding the robot to move to the location at a suitable timeline using the sensory behaviour map to determine the behaviour associated with the sensory interactions using the one or more sensors.

5. The system of claim 1, wherein the processor is configured to generate an orientation map of the one or more sources by determining a position, and a spatial orientation of the one or more sources in the 3D environment, wherein the spatial orientation is determined with respect to at least one of (i) the robot (ii) at least one object in the 3D environment, and (iii) a detected boundary of the 3D environment.

6. The system of claim 1, wherein when the sensory input is the visual sensory input, the classifier uses a visual processing technique to categorize the one or more sources into one or more category levels.

7. The system of claim 1, wherein when the sensory input is the auditory sensory input, the classifier uses a source categorization multi-stage ensemble algorithm to categorize the one or more sources into one or more category levels.

8. The system of claim 1, wherein the processor is configured to generate the sensory behaviour map, wherein when the sensory input comprises an auditory sensory input and a visual sensory input, the classifier uses a source categorization multi-stage ensemble algorithm to categorize the one or more sources associated with the auditory sensory input into one or more category levels and an visual processing technique to categorize the one or more sources associated with the visual sensory input into one or more category levels, wherein the one or more sensors comprise visual sensors and acoustic sensors.

9. The system of claim 1, wherein the one or more sources comprise a sound source that is tracked using one or more tracking algorithms, wherein the one or more tracking algorithms tracks a motion profile of the robot, a location of the sound source and a current position of the robot along with a previous location of the sound source and a previous position of the robot.

10. The system of claim 1, wherein the classifier comprises two or more ensemble classifiers, wherein the classifier identifies which of the ensemble classifier out of the two or more ensemble classifiers provide the best performance for identifying and categorizing the one or more sources and selects the best performing ensemble classifier for subsequent events of the sensory interactions by enabling the system to learn which algorithm is suitable for detecting and categorizing each of the one or more sources.

11. The system of claim 1, wherein the processor is trained using a multiple two-dimensional (2D) and a three-dimensional (3D) visual and auditory samples associated with the one or more sources in the 3D environment to recognize a position of one or more first sources or one or more second sources in the 3D environment by creating a spatial orientation map comprising of the one or more first sources associated with a sound or a movement in the 3D environment, wherein the spatial orientation map enables localizing or identifying the behaviour to generate the intelligent response customized to the one or more sources.

12. A method for behaviour mapping and categorization one or more sources of one or more sensory inputs by learning their respective behaviour using a robot, the method comprising steps of:

detecting the one or more sensory inputs comprising a visual sensory input and an auditory sensory input, associated with a three dimensional (3D) 3D environment using the one or more sensors comprising visual sensors and acoustic sensors;

determining the one or more sources of the one or more sensory inputs by processing the one or more sensory inputs and behaviour mapping and categorization of the one or more sources and an associated timeline of the 3D environment;

generating a sensory behaviour map of the 3D environment with the one or more sources, wherein the sensory behaviour map comprises a location and mapping of the one or more sources in the 3D environment and a sensory interaction associated with each of the one or more sources and an associated timeline of the sensory behaviour, wherein the sensory behaviour map is generated by: (i) analyzing the auditory sensory input and the visual sensory input and (ii) associating the one or more sources associated with the auditory sensory input and the one or more sources associated with the visual sensory input along with the location and the timeline in the 3D environment using the associated location coordinates;

identifying and categorizing the one or more sources by a classifier comprising a source categorization multi-stage ensemble algorithm into one or more category levels by (i) classifying, using the classifier, the one or more sensory inputs of the one or more sources to generate an associated confidence score at a first level and classify a first category label for entities using the source categorization multi-stage ensemble algorithm that detects and classifies the associated confidence score of the one or more sensory inputs at the first level of the source categorization multi-stage ensemble algorithm, (ii) classifying, using the classifier, a second category label for entities and an associated second confidence score at a second level of the source categorization multi-stage ensemble algorithm with inputs from the first level of the source categorization multi-stage ensemble algorithm, and (iii) categorizing the one or more sources into the one or more category levels with the first category label and the second category label, wherein classifiers of same type are trained with different data sets and different algorithm parameters comprising iteration time;

detecting one or more behaviours associated to the one or more sources and the one or more category levels in the 3D environment, wherein the one or more behaviours are categorized into a behaviour category by analyzing the one or more sensory inputs and the location of the one or more sources in the 3D environment and an associated timeline of the one or more behaviours, wherein the sensory interaction is between two or more sources or between one or more sources and objects in the 3D environment;

determining an intelligent response, based on an adaptive learning input, that is customized to (i) the one or more sources, (ii) the one or more behaviours of the one or more sources, (iii) the timeline of the one or more behaviours or (vi) a combination thereof, or based on an input from the one or more sources, wherein the intelligent response is determined by (a) analyzing the sensory behaviour map and the timeline of the one or more behaviours, (b) identifying a pattern of each of the one or more behaviours associated to each of the one or more sources over a recurring time period, and (c) associating the location to the one or more behaviours or associating the location and the timeline to each of the one or more behaviours; and enabling the robot to move to the location using the sensory behaviour map to execute the intelligent response, wherein the intelligent response comprises a list of predetermined actions and their priority of execution.

* * * * *